J. SMITH.
Seed Dropper.
No. 27,162.  Patented Feb. 14, 1860.
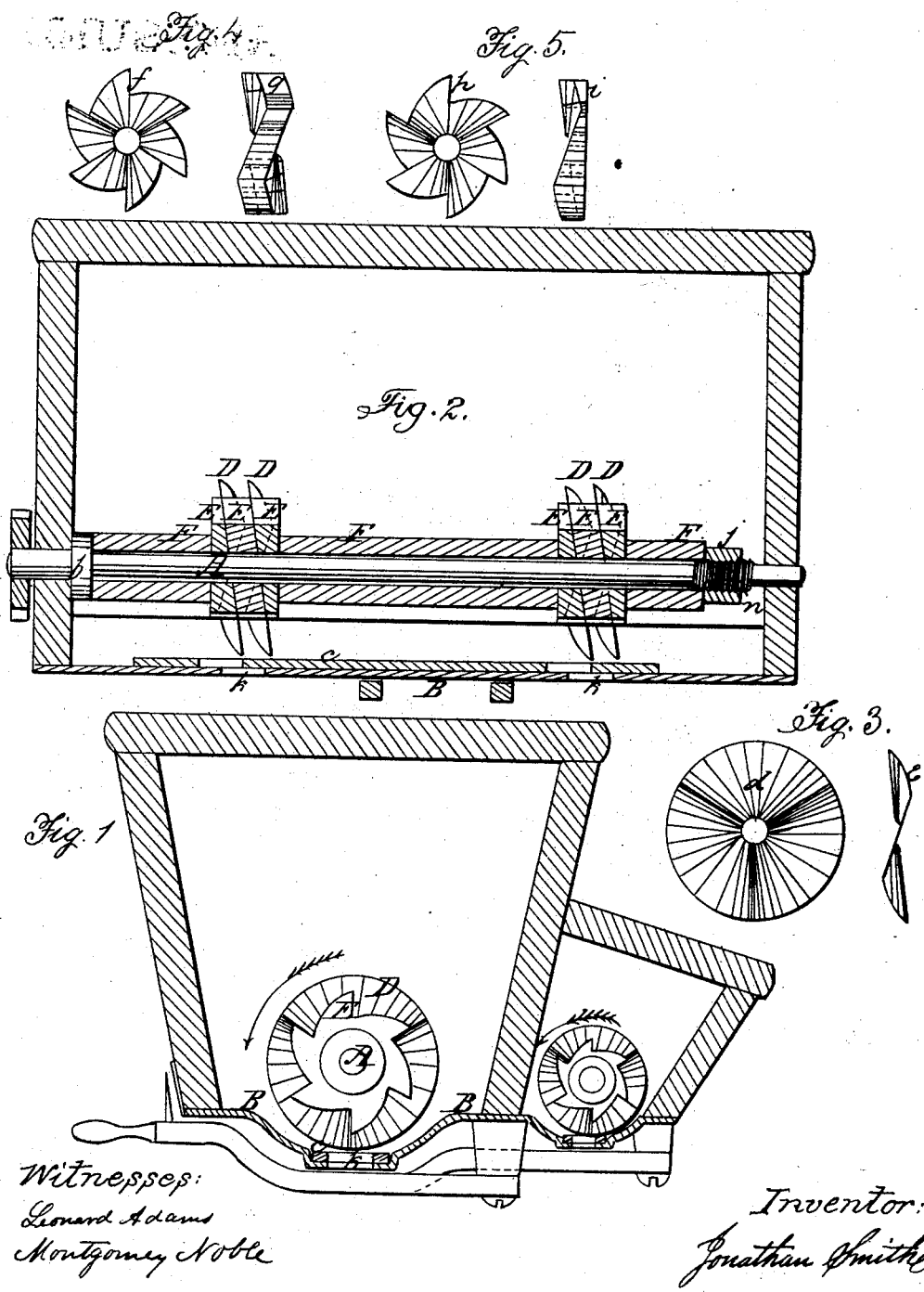

UNITED STATES PATENT OFFICE.

JONATHAN SMITH, OF TIFFIN, OHIO.

IMPROVEMENT IN SEED-DRILLS.

Specification forming part of Letters Patent No. 27,162, dated February 14, 1860.

*To all whom it may concern:*

Be it known that I, JONATHAN SMITH, of Tiffin City, county of Seneca, and State of Ohio, have invented a new and useful Improvement in Grain and Seed Drills; and I do hereby declare that the following is a clear, full, and exact description of the construction and operation of the same, reference being had to the accompanying drawings, and to the letters of reference marked thereon—

Figure 1 being a sectional end view; Fig. 2, a sectional side view; Fig. 3, a detached corrugated plate; Fig. 4, a center corrugated ratchet-washer; Fig. 5, a side corrugated ratchet-washer.

To enable others skilled in the art to make and use my machine as constructed for grain or other seed drilling or sowing purposes, I will now describe its parts as arranged.

First, I construct my grain or seed box the same as those in general use, with the exception of the bottom, which I make concave form, the circle of which I make of a larger radius than that of the agitating-wheels, so as to bring the lower edge of said agitating-wheels a little nearer the bottom, directly over the feed-slide, at the same time giving the grain or seed a chance with the inclination it has to settle down the sides of the aforesaid concave bottom. In the center of said bottom I form a recess, in which the feed-slide is placed, to which the indicator is attached. By examining Fig. 1, letters B B, the form of the bottom will be seen, as above described. At Fig. 1, letters D D, the proportionate diameter of the agitating-wheels will be seen. Said bottom I make of metallic substance. At Fig. 1, letter c, the feed-slide as above described will be seen resting in the aforesaid recess in bottom, as seen at Fig. 1, letters B B, the feed-slide, letter c, same figure.

I construct and arrange my agitators as follows: First I use a rod of proper length so as to extend the full length of the grain or seed box and revolve in proper bearings at each end of the aforesaid box, on which I place the agitators, as seen at Fig. 2, letters A A, letting the rod extend through at one end of said box to receive a suitable pinion. Said pinion is propelled by the drive-wheel on axle, in the usual way as other grain or seed drills. On the rod at one end, inside the grain or seed box, I place a fixed collar, as seen at Fig. 2, letter b. I then place on the rod another collar of suitable length, as seen at Fig. 2, letter F. Then I make a corrugated side and ratchet-formed edged washer, as seen at Fig. 1, letter E, showing the ratchet form of the edge, Fig. 5, letter i, showing the form of the corrugated side of the aforesaid washer. I then follow said washer with a corrugated wheel made of a thin metallic substance, Fig. 3, letters d e, so as not to catch a body of grain or other material that may be mixed with the grain or seed, thereby causing it to clog or mash the seed. Said corrugated wheel is so corrugated as to conform to the corrugated washer aforesaid. I then follow said wheel with a second corrugated washer corrugated on both sides and ratchet-formed edge, Fig. 4, letters f g. I then follow the last-named washer with a second corrugated wheel, which conforms to the washer aforesaid. I then follow the aforesaid and second corrugated wheel with a third corrugated and ratchet-formed washer, Fig. 5, letters h i, which is followed by a collar, Fig. 2, letter F, same as the first, making the agitator complete for one discharge-hole. Said arrangement is repeated until each discharge-hole is furnished with an agitator. A thread is cut on one end of the aforesaid rod, as seen at Fig. 2, letter n, to receive a nut. After all the agitators and collars are placed on said rod, as seen at Fig. 2, letter A being the rod, letters F F F the collars, letters E E E being the corrugated and ratchet-formed washers, letters D D D D the corrugated wheels, the whole arranged as above described. The nut, letter j, is then placed on the rod, letter A, and drawn firmly against the collar, letter F, as seen at Fig. 2, letters n and j. By thus drawing the nut, letter j, it will be seen that all the corrugated and ratchet-formed washers and corrugated wheels, with a collar between each set of wheels and washers, as aforesaid, are firmly fastened and permanently located on the aforesaid rod A, Fig. 2. I make the center washer, Fig. 4, letters f g, of a proper thickness, so that by revolving the rod A the corrugated wheels will give a zigzag motion from one end of the discharge-hole to the other, as seen at Fig. 2, letters k k, at bottom letters B B, the agitators being marked letters D D and D D and E E E. Thus you will readily perceive the object in view and the means used to accomplish it. First, that, while the corrugated wheels are so arranged as to give a continuous zigzag motion to the grain or seed, the ratchet-formed edge of the washers, as aforesaid, has the tendency to force the grain or seed downward, at the same time facilitating the zigzag motion given by the corrugated wheels to force the grain or seed through the discharge-holes, the form of the bottom being such as to carry the grain or seed to the proper point for the agitators to receive it, and thus keeping in constant agitation the grain or seed, so that a positive discharge is kept up while the machine is in motion if the feed-slide is drawn. The same arrangement may be used for sowing seed with the grain by attaching a small box to the front or back of the grain or seed box, as will be plainly seen by referring to drawings, Fig. 1.

I am aware of the use of spiral flanges set in reverse position upon revolving hubs, as patented by Page & Clary, December 1, 1857. Such construction I disclaim; but What I do claim is—

The thin metal corrugated wheels D and ratchet-washers E, conforming therewith in lateral surface, in combination with shaft A, collars F, and concave hopper-bottom B, the operation being as set forth.

JONATHAN SMITH.

Witnesses:
N. M. BARNES,
A. T. BARNES.